United States Patent [19]

Esposito

[11] 4,284,287
[45] Aug. 18, 1981

[54] TELESCOPING HANDLE FOR A SMALL HEAVY DUTY HAND TRUCK

[76] Inventor: Patsy Esposito, 350 Clarkson Ave., Brooklyn, N.Y. 11226

[21] Appl. No.: 83,213

[22] Filed: Oct. 9, 1979

[51] Int. Cl.³ ............................................. B62B 1/12
[52] U.S. Cl. ........................... 280/47.37 R; D12/34; 16/115; 280/655; 403/108; 403/329
[58] Field of Search ................. 280/47.37 R, 47.37 L, 280/47.37 C, 47.27, 655; 403/108, 329; 16/111 R, 111 A, 115; D12/32, 34; 135/75

[56] References Cited

U.S. PATENT DOCUMENTS

D. 246,774  12/1977  Esposito .............................. D12/34
3,998,476   12/1976  Kazmark, Sr. ........... 280/47.37 R X
4,072,319    2/1978  Berger ........................... 280/47.37 R Primary Examiner—David M. Mitchell
Assistant Examiner—D. W. Underwood
Attorney, Agent, or Firm—Auslander, Thomas & Morrison

[57] ABSTRACT

A three-part extension handle includes only two interfitting telescopic parts which provides a strong handle for a small heavy-duty collapsible hand truck. The handle has great strength. The two-part handle is fixable at the end of the upright support and includes means that release the locked telescopic portions. Collapsing the handle is the reverse procedure, leaving the handle firmly locked closed.

8 Claims, 6 Drawing Figures

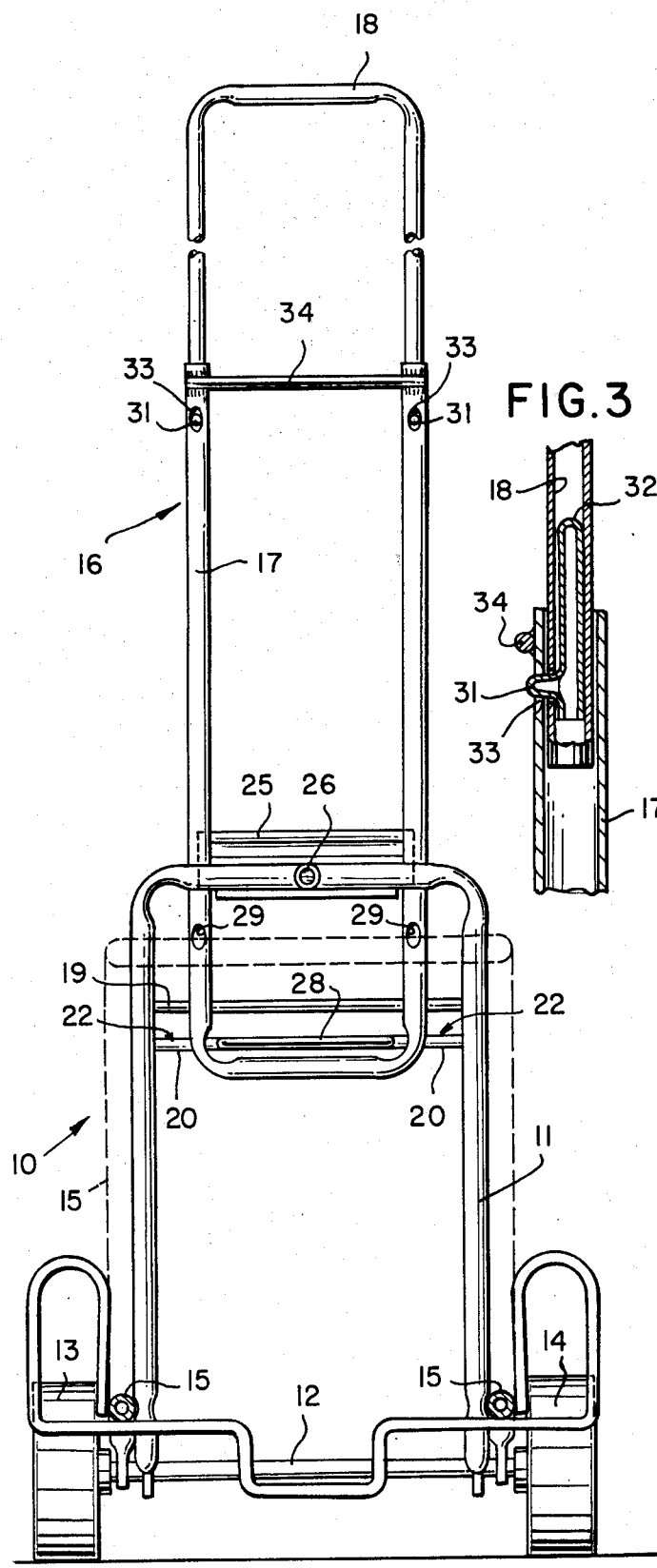
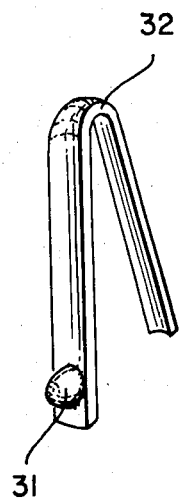
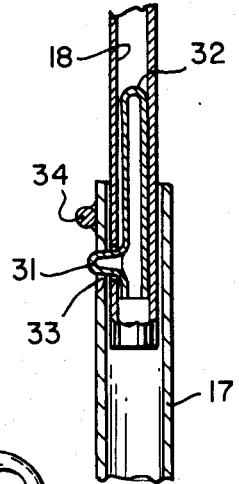
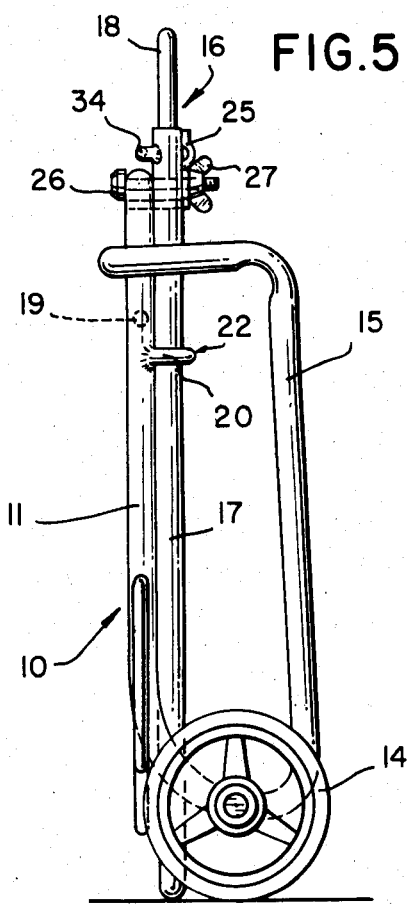

TELESCOPING HANDLE FOR A SMALL HEAVY DUTY HAND TRUCK

The present invention relates to a telescoping handle for a small heavy duty hand truck, particularly a small collapsible hand truck which may be used for handling personal luggage.

In hand trucks such as disclosed in the co-pending application by the same inventor entitled HAND TRUCK, Ser. No. 082,944 filed 10/09/79, a collapsible hand truck with an extendable platform is disclosed. The extendable platform of the HAND TRUCK invention has a load-carrying capability that adapts for use with luggage and heavy articles in a collapsible hand truck.

The present invention is particularly adapted to small heavy duty hand trucks of the type disclosed in said co-pending application. Where small heavy duty collapsible hand trucks are desired, particularly for the transportation of personal luggage, the size of the hand truck when collapsed for being carried or stowed can be very important. A problem with the small hand truck is that its handle usually has to be approximately the same length as one for a larger hand truck for a user to be able to comfortably reach the handle while transporting luggage. In said co-pending application, titled HAND TRUCK, the hand truck includes a basic frame large enough to carry heavy duty articles. The handle of that invention cannot easily be collapsed smaller than the frame, thus, a handle approximately the size of the frame is long enough to be reached when extended for comfortable carrying. The collapsed hand truck substantially corresponds to the size of the frame.

Hand trucks of the past have oftentimes had larger frames than the load required and small extending handles so that the user could reach the hand truck comfortably, or were provided with multiple telescoping handles, telescoping into the frame so that minimum size and collapsibility might be achieved. A typical luggage carrying hand truck with a collapsible handle is exemplified in U.S. Pat. No. 3,998,476, where a small luggage carrier is provided with a double extending telescopic handle, telescoping into the frame. Such hand truck limits the strength of the handle, particularly for a hand truck adapted for variable loads, including heavy duty articles. The handle of the U.S. Pat. No. 3,998,476 patent telescopes from inside the upright support and is in three sections, two sections held within the upright support. Each succeeding section is necessarily smaller than the other. Because of this, the strength of the handle and the load carrying capacity of the hand truck is limited by the diameter of the upright support. Further, with a small, collapsible hand truck, in order to have a handle that extends a sufficient distance to be reached by the user comfortably, it may be necessary to have a handle that extends in three sections.

According to the present invention a telescoping handle for a small collapsible heavy duty hand truck is provided, which is extendable to reach a length sufficient to be comfortably grasped without sacrificing strength of the handle. The hand truck with the telescoping handle of the present invention is collapsible into a small unit, yet when opened for use, is strong with a handle able to support a heavy load.

The invention is carried out in a small strong, collapsible hand truck with an upright support and a handle including a first U-shaped portion and a second U-shaped portion slidably interengaged with the handle having two pairs openings in the first U-shaped portion, which are horizontally aligned, one pair near the upper portion of the first U-shaped portion and the other pair near the lower portion of the first U-shaped portion. There are also a pair of openings in the second U-shaped portion, horizontally aligned, near the lower part of the second U-shaped portion. Detents extending through the pair of openings in the second U-shaped portion and spring means within the second U-shaped portion, bias the detents to extend through said openings, the detents are engagable in either of two pairs of openings in the first U-shaped portion. There are guide means on the upright support means, the guide means adapted to guide the handle, holding it adjacent to upright support means, a first stop means to the upright support means is adapted to stop the upward movement of the handle in the guide means, a second stop adjacent said support means is adapted to stop the downward movement of the handle in the guide means, and there are means to fix the handle in selected positions with relation to the upright means, the means to fix the handle including means to depress the detent extending through the first U-shaped portion's openings and to release the first and second U-shaped parts from locking engagement.

In one embodiment, the upright support means is a bent metal tube. It is oftentimes preferable to include cross braces on the upright support to guide the handle. The cross braces may include loops to aid the guiding and an inset as a stop to catch the first U-shaped portion as it is raised.

The handle may have a stop. It is preferable that the various stops align the pairs of openings with the fixing brackets so that when the bracket is tightened, it impinges on the detents to release them from their engagement.

The top bar of the upright support is preferably round so that it may closely engage the openings to depress the detent. The openings themselves may even be slightly recessed to accept the top bar. The detents are more easily released where the ends are tapered, or rounded.

The telescoping handle of the present invention is firmly lockable in its extended or a retracted position, and is easily released from its locked positions to extend or to retract within itself. Once the handle is closed by fixing it in its down position and retracting the second portion, the second portion locks closed, thus protecting the collapsed hand truck from involuntarily extending the handle when it is not in use.

The handle, by being attached adjacent to the upright support, obtains its first extension when raised to the upper position. The second extension then is only the telescoping of the two U-shaped portions which are interengaged. Thus, the second U-shaped portion is strong, being only a trifle smaller than the first U-shaped portion, yet the handle is able to extend to a distance approximately equal to three upright portions.

Although such novel feature or features believed to be characteristic of the invention are pointed out in the claims, the invention and the manner in which it may be carried out, may be further understood by reference to the description following and the accompanying drawings.

FIG. 2 is a front elevation of FIG. 1 with the handle partially extended.

FIG. 3 is a detail of a catch pin in the telescoping handle of the present invention.

FIG. 4 is an isometric of the spring catch pin of FIG. 3.

FIG. 5 is a side elevation of the hand truck including the present invention in collapsed position, viewed from the side opposite that of FIG. 1.

Referring now to the figures in greater detail, where like reference numbers denote like parts in the various figures.

Figure 1:
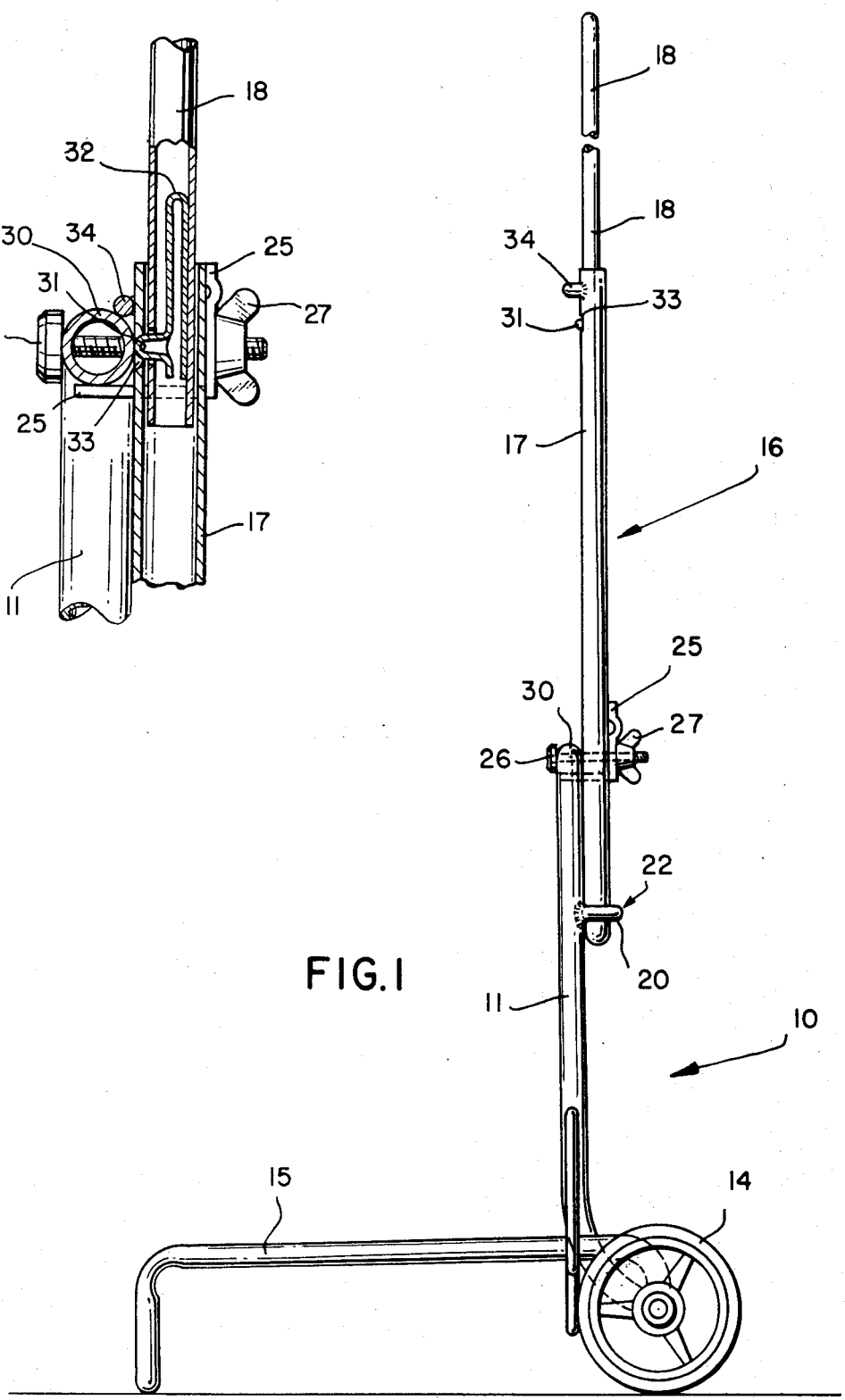
FIG. 1 is a side elevation of a hand truck with the handle of the present invention.

A hand truck 10, carrying the telescoping handle of the present invention, preferably includes a frame 11 mounted on an axle 12. Also mounted on the axle 12 are wheels 13, 14 and an extendable platform 15. With the platform 15 extended, the hand truck 10 supports itself as can be seen in FIG. 1.

The telescoping handle 16, in a preferred embodiment, comprises a first bent tubular metal U-shaped portion 17 and a second tubular U-shaped portion 18, which interfits into the first U-shaped portion 17. The handle 16 is held at the frame between cross brace 19, which is substantially on a plane with the frame 11 and an extending cross brace 20, which includes two loops 22, which engage the arms of the first U-shaped portion 17. The handle 16 is controlled by a bracket 25 held on a screw 26, which passes through the frame 11 and is tightened by a wing nut 27.

Figure 6:
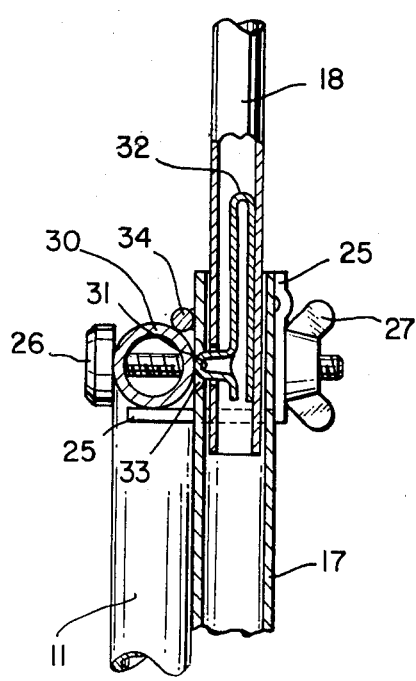
FIG. 6 is a detail of the catch pin being released.

The handle 16 is extended by loosening the wing nut 27 and raising it. The bottom of the first U-shaped portion 17 acts as a stop and engages the inset portion 28 of the extending brace 20. The extending brace 20 and cross brace 19 keep the handle 16 guided in a track formed by the loops 22. The handle is held in extended position by tightening the wing nut 27. The ends of a bracket 25 tightly grasp the arms of the handle 16 and hold the handle with the bottom of the first U-shaped portion 17 stopped on the inset 28 and squeezed between the bracket 25 and the frame 11. When the handle 16 is thus engaged and held by the bracket 25, the round top bar 30 of the first U-shaped portion 17 is depressed into the lower openings 29 with the first U-shaped portion 17, depressing the detents 31 on the spring clips 32, which are engaged in the lower opening 29, as can be seen in FIG. 6. When the handle 16 is thus engaged, a simple tug on the second U-shaped portion 18 disengages the rounded end of the detents 31 from the opening 29 and allows the second U-shaped portion 18 to slide upward until the spring clip 32 forces the detents 31 into the upper openings 33, locking the two U-shaped portions 17, 18, in extended position.

The first U-shaped portion 17 is provided with a cross brace 34 to strengthen it and keep the tubing of the first U-shaped portion 17 in position. The cross brace 34 also acts as a stop to hold the handle 17 so that the openings 31 can be engaged with the top bar 30 when the handle is to be collapsed.

In use, the hand truck 10 is opened from the collapsed position as shown in FIG. 5. The extendable platform 15 is preferably swung open to support the hand truck 10. The wing nut 27 is then loosened, releasing the handle 16 from the position as shown in FIG. 5. The handle 16 is grasped from the top and raised until the bottom of the first U-shaped portion 17 is stopped by the inset 28 of the extending brace 20. In this position, the openings 29 are aligned with the top bar 30 of the frame 11.

Tightening the wing nut 27 grasps the handle 16 to hold it in position and further engages the top bar 30 in the openings 29, depressing the detents 31 on the spring clip 32 inward. An upward tug on the second U-shaped portion 18 slides the round ends of the detents 31 off the inside wall of the openings 29 in the first U-shaped portion 17, releasing the second U-shaped portion 18 to slide upward until the spring clips 32 force the detents 31 through the openings 33, locking the handle 16 in extended position.

The first telescoping effect is obtained by extending the handle 16 to its upper position and holding it there, locked by the bracket 25 and screw 26 through the top bar 30 of the frame 11 and held by the wing nut 27. The grasp of the bracket 25, wing nut 27 and screw 26 through the top bar 30 with the handle 16 stopped at the inset 28 and guided between the braces 19, 20, is very strong. Thus, only the first and second U-shaped portions 17, 18 telescope into each other, allowing both of these sections to be larger and stronger than two sections telescoping from within the tubing of the frame 11, as in the prior art. Particularly with the strength the frame 11 and platform 15 impart to the hand truck 10, a strong handle 16 is necessary to be able to adequately support the heavy load the hand truck 10 is capable of carrying.

The platform 15 is preferably supported in extended position by means disclosed in the co-pending application entitled HAND TRUCK.

To collapse the hand truck of the present invention, the wing nut 27 is loosened, the handle 16 slides down so that the cross brace 34 rests on the top bar 30. Retightening the wing nut 27 repeats the release of the detents 31 from their engagement in the openings 33, thus allowing the second U-shaped portion 18 to be retracted into the tube of the U-shaped portion 17, sliding along the inside until the spring clip 32 forces the detents 31 into engagement in the openings 29. The hand truck 10 is fully collapsed when the extendable platform 15 is retracted, as shown in FIG. 5.

The terms and expressions which are employed are used in terms of description; it is recognized, though, that various modifications are possible.

It is also understood the following claims are intended to cover all of the generic and specific features of the invention herein described, and all statements of the scope of the invention which, as a matter of language, might fall therebetween.

Having described certain forms of the invention in some detail, what is claimed is:

1. A telescoping handle for a small strong collapsible hand truck, said hand truck including at least an upright support means, said handle including a first U-shaped portion and a second U-shaped portion, said U-shaped portions slidably interengaged, two pairs of openings in said first U-shaped portion, each said pair horizontally aligned, one pair near the upper portion of said first U-shaped portion and the other pair near the lower portion of said first U-shaped portion, a pair of openings in said second U-shaped portion, said pair of openings horizontally aligned, said pair of openings near the lower part of said second U-shaped portion, detent means extending through said pair of openings in said second U-shaped portion, spring means within said second U-shaped portion biasing said detent means to extend through said openings, said detent means engagable in either of said two pairs of openings in said first U-shaped portion, guide means on said upright support means, said guide means adapted to guide said handle adjacent to said upright support means, a first stop means, said first stop means adjacent to said upright support means adapted to stop the upward movement of said handle in said guide means, a second stop means adjacent said upright support means adapted to stop the downward movement of said handle in said guide means, and means to fix said handle in selected position with relation to said upright means, said means to fix including means to depress said detents extending through said first U-shaped portion's openings and release said first and second U-shaped parts from engagement.

2. The invention of claim 1 wherein said upright support means includes a U-shaped bent metal tube.

3. The invention of claim 1 or 2 wherein said guide means on said upright support includes two cross braces.

4. The invention of claim 3 wherein one of said cross braces includes a pair of loops.

5. The invention of claim 4 wherein one said cross brace includes an inset.

6. The invention of claim 5 wherein said first stop means includes said inset, said first U-shaped portion of said handle engagable with said inset.

7. The invention of claim 1 or 2 wherein said pairs of openings in said first U-shaped portion are adjacent said means to depress said detent when said handle is at stopped position.

8. The invention of claim 1 or 2 wherein said means to fix said handle includes a bracket and screw means to fix said handle between said bracket and said upright support means.

* * * * *